(12) United States Patent
Zascavage

(10) Patent No.: US 6,327,808 B1
(45) Date of Patent: Dec. 11, 2001

(54) FISHING LURE ASSEMBLY AND RELATED METHODS

(76) Inventor: Bryan Zascavage, 61 SE. 11$^{th}$ St., Pompano Beach, FL (US) 33060

( * ) Notice: Subject to any disclaimer, the term of this patent is extended or adjusted under 35 U.S.C. 154(b) by 0 days.

(21) Appl. No.: 09/436,288

(22) Filed: Nov. 8, 1999

Related U.S. Application Data

(60) Provisional application No. 60/107,525, filed on Nov. 9, 1998.

(51) Int. Cl.$^7$ .................................................. A01K 91/100
(52) U.S. Cl. .............................. 43/44.9; 43/42; 43/42.36; 43/42.09
(58) Field of Search ........................... 43/9.8, 17.2, 26.2, 43/42.05, 42.08, 42.09, 42.15, 42.36, 43.1, 44.9

(56) References Cited

U.S. PATENT DOCUMENTS

| | | | |
|---|---|---|---|
| 4,408,411 | * 10/1983 | Skarnells ................................ | 43/17.2 |
| 4,696,125 | * 9/1987 | Rayburn ................................. | 43/43.14 |
| 5,167,089 | * 12/1992 | Schriefer ................................ | 43/42.36 |
| 5,197,220 | * 3/1993 | Gibbs et al. ........................... | 43/42.09 |

* cited by examiner

*Primary Examiner*—Peter M. Poon
*Assistant Examiner*—F. C Copier
(74) *Attorney, Agent, or Firm*—Malloy & Malloy, P.A.

(57) ABSTRACT

A fishing lure or fishing tackle assembly designed to facilitate rapid and efficient attachment to and removal from a fishing line and/or a pre-rigged bait structure commonly used in offshore fishing. The fishing lure assembly includes a head portion having a channel formed within its interior and extending along the length of the head portion; the head portion also includes a slit extending from its exterior surface and being disposed into the channel; and the head portion further has a locking member situated within the channel and being movable to close access from the slit into the channel during a locked position to secure the fishing line within the channel of the head portion.

17 Claims, 3 Drawing Sheets

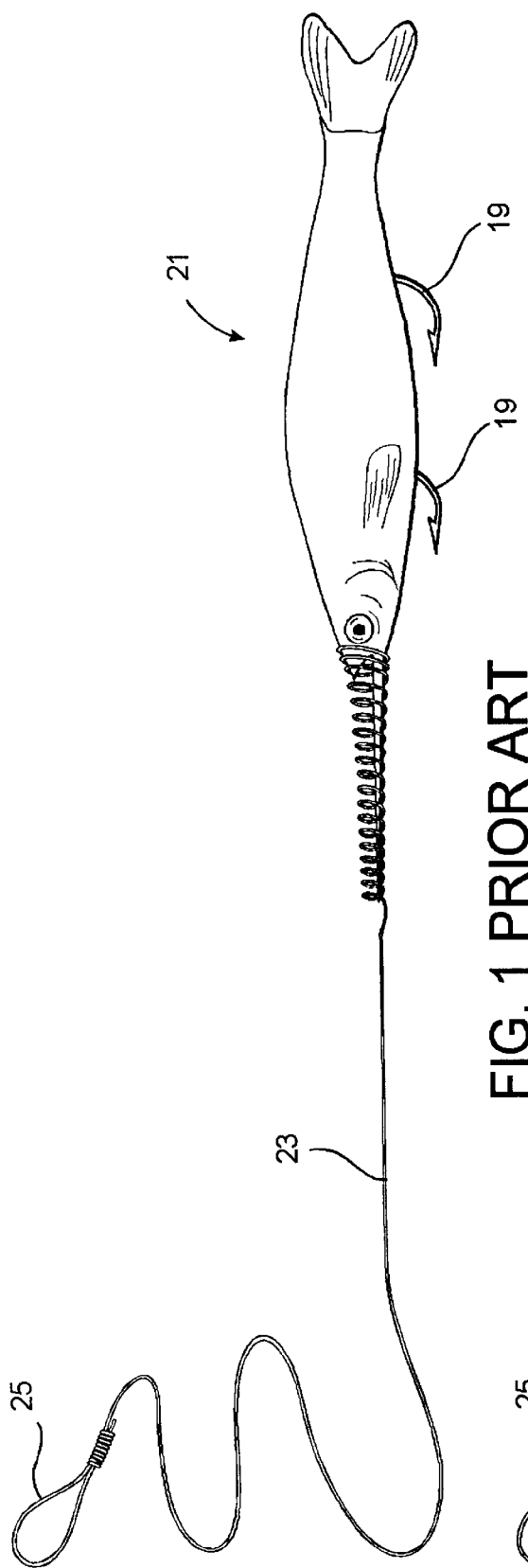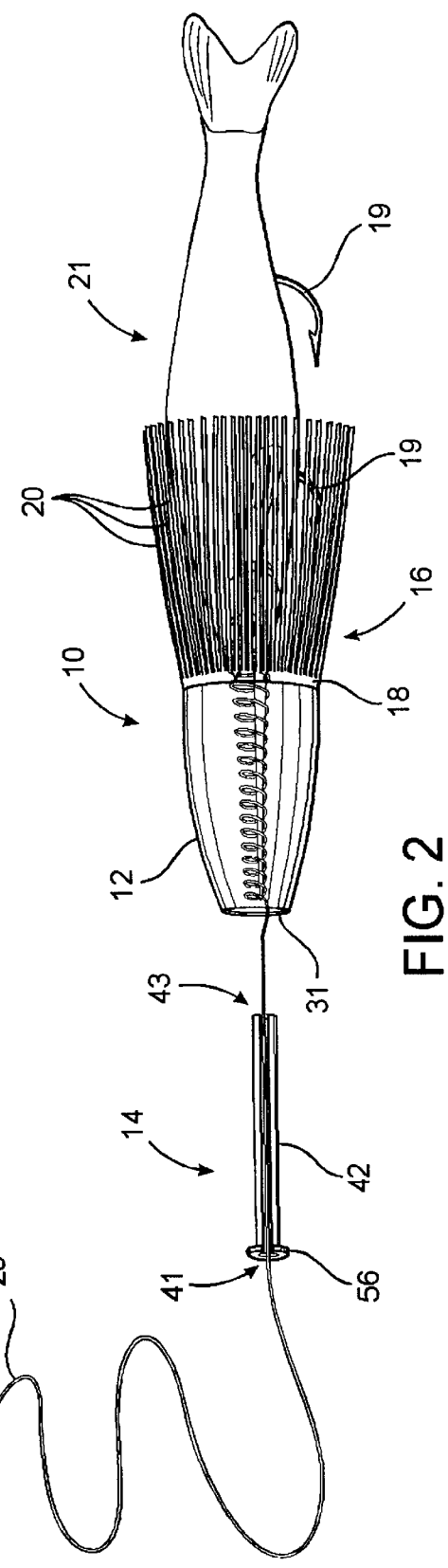

FISHING LURE ASSEMBLY AND RELATED METHODS

RELATED APPLICATION

The present application is based on and a claim to priority under 35 U.S.C. Section 119(e) is made to provisional patent application filed with the U.S. Patent Office on Nov. 9, 1998 and assigned U.S. Ser. No. 60/107,525.

FIELD OF THE INVENTION

The present invention relates to fishing tackle including a lure assembly structured to be easily and quickly attached to and removed from a leader wire or other portions of a fishing line. More particularly, the present invention is adapted for use in combination with a pre-rigged bait structure and is structured for easy attachment to and removal from the pre-rigged bait structure without requiring any disassembly, cutting or detachment of the leader wire associated with the pre-rigged bait structure from a fishing line. The lure assembly of the present invention is also readily disposed in a locked position for ensuring that upon being mounted to the pre-rigged bait structure, the lure assembly can be reliably used for fishing, even in rough water, without concern for separation.

BACKGROUND OF THE INVENTION

In the sport of fishing, it is common practice to "troll" offshore for a variety of large fish by trailing a baited line from behind a slowly moving boat. For trolling, it is also common practice to use a pre-rigged bait structure in combination with a fishing lure. Typically, the pre-rigged bait structure includes a bait fish, often a "ballyhoo" or other type of fish, and a relatively short trolling or leader wire. If desired, the trolling wire may also be provided with a sinker or similar fishing tackle component. When a bait fish is included as part of the pre-rigged bait structure, one end of the trolling or leader wire is secured around the ballyhoo's nose and/or head and one or more hooks are arranged to protrude outwardly from the body of the bait fish. The opposite end of the trolling wire is formed into a connecting loop. The connecting loop is structured to permit the removable attachment of the trolling or leader wire to the free, distal end of the fishing line coming off the fishing pole, which typically includes a snap swivel or similar device that can be easily attached to the connecting loop. While the use of bait fish is popular in pre-rigged bait structures, it is also well known to eliminate the bait fish and merely attach one or more hooks at the distal end of the leader or trolling wire, such that the hooks are at least partially hidden or covered by a trailing skirt or other portion of the lure assembly.

With respect to fishing lures commonly used with such a pre-rigged bait structure for purposes of trolling, a typical lure will include a head portion, having a bore formed therein through which the trolling wire passes. An elongated skirt may also be mounted to the rear or trailing end of the head portion, and is structured to allow the trolling or leader to pass there through. Both the head portion and elongated skirt can comprise a variety of colors, designs and configurations. When a bait fish is used, the head portion of the fishing lure is normally disposed on the trolling wire in front of and substantially adjacent to the head of the bait fish, so as to give the appearance of being the head of the fish, with the skirt disposed in at least partially, covering a relation over the body of the bait fish. Also, the skirt portion or at least some trailing portion of the fishing lure overlies the area of attachment of the trolling wire to the bait fish and may also be disposed to at least partially cover the one or more hooks, whether or not a bait fish is included as part of the pre-rigged bait structure. In addition, the connecting loop, which is removably secured to the snap swivel as set forth above, extends forwardly from the head portion of the fishing lure to facilitate interconnection with the free distal end of the fishing line.

Consequently, although the above described types of pre-rigged bait structures are common place, it presents the fisherman with an obstacle in that each time he or she desires to begin fishing or trolling, the fishing lure must first be mounted on the pre-rigged bait structure. That step is problematic because the connecting loop of the trolling wire is almost always of a size which prevents it from being passed through the interior bore of the fishing lure's head portion. Similarly, if a fisherman desires to change the type of fishing lure being used on a pre-rigged bait structure, the connecting loop cannot be easily detached therefrom. It should be appreciated that the fisherman may wish to change the fishing lure a number of times during an offshore excursion, dependent upon the type of fish which he seeks to catch or upon a change in any number of weather or other fishing conditions during the time frame in which the fishing is being conducted. In addition, a fisherman may have to and often does detach the trolling or leader wire and connecting loop from the free end of the fishing line, and from the fishing lure, whenever a game fish is caught, or when the bait fish becomes detached from the pre-rigged bait structure without the fish becoming hooked. In such cases a new pre-rigged bait structure is secured to the fishing line and lure.

In other words, in order to mount a conventional fishing lure on pre-rigged bait structures, the fisherman is normally required to disassemble or remove the connecting loop and/or related structure disposed at the front end of the trolling wire, and then thread the trolling or leader wire through the skirt and the bore of the head portion of the fishing lure. The connecting loop is then re-assembled so that it may serve to secure the leader wire to the snap swivel at the free, distal end of the fishing line. In general, each of these steps must be taken in order to mount a fishing lure to a pre-rigged bait structure or to remove a fishing lure therefrom, whether to be replaced with a new fishing lure or to outfit the fishing lure with a new pre-rigged bait structure. This in turn means that a good deal of time is spent just in preparing to fish and/or in changing a fishing lure or in re-loading a fishing lure with a bait fish. It is not only inconvenient, but also cumbersome, and in adverse weather conditions or in rough water, the task is only made more difficult and time consuming, with the result that a fisherman may neglect making changes in his fishing tackle. For example, such manipulation of the fishing tackle is particularly burdensome when it involves re-tying knots or re-threading the trolling line through lures, weights, etc. Other difficult conditions include when the seas are rough, when there are poor lighting conditions, when it is raining or during unusually cold and/or unusually hot weather, etc. In addition, certain components of the fishing tackle could be easily lost due to their relatively small size and the adverse conditions under which changes, repair or replacement are attempted.

Accordingly, there is a need in the sport of fishing and particularly but not exclusively when trolling or participating in offshore fishing, for an improved fishing lure assembly or a fishing tackle assembly which can be easily mounted on and removed from a trolling or leader wire and/or fishing line. Any such fishing lure assembly or like fishing tackle assembly should be capable of being used in combination with the conventional, pre-rigged bait structure which may or may not include a bait fish secured to a trolling leader wire and having a connecting loop disposed at one end for attachment to a fishing line. In addition, any such fishing lure assembly or like fishing tackle assembly should be structured to be easily positioned in a location so as to be closely adjacent and in at least partially covering relation to the bait fish when used a part of the pre-rigged bait structure and/or to one or more hooks, without requiring the disassembling, cutting, severing or other detaching or any portion of the trolling wire and/or fishing line to which the pre-rigged bait structure is attached. In addition, any such fishing lure or fishing tackle assembly should be sufficiently versatile in design so as to be constructed to be substantially similar in appearance and function to conventional lure assemblies which have gained popularity due to their success in attracting fish.

SUMMARY OF THE INVENTION

The present invention relates to an improved fishing lure assembly or fishing tackle assembly structured to be easily and quickly attached and detached from a trolling or leader wire and/or fishing line, depending upon the rigging of the fishing tackle being utilized. The fishing lure of the present invention, in one embodiment, is particularly adapted to facilitate mounting on and removal from a pre-rigged bait structure of the type including a trolling or leader wire secured to a bait fish in the conventional fashion. In alternative embodiments, structural features of the present invention could also be incorporated in other fishing tackle components, other than a fishing lure assembly, such as but not limited to a weighted sinker or other structures and components, wherein attachment and detachment of such fishing tackle components can be accomplished without having to disassemble, cut or otherwise detach a fishing line, leader wire, trolling wire or other components or the pre-rigged bait structure which may or may not include a bait fish.

In another embodiment, the fishing lure assembly or fishing tackle assembly of the present invention includes a head portion having a leading front end, a trailing back end, and an interior channel extending along the length thereof. The interior channel terminates in an open end at the leading front end of the head portion, and also, but, not necessarily in an open, oppositely, disposed end at the trailing end of the head portion. These open ends are respectively formed substantially adjacent to the front leading end and trailing end of the head portion, relative to the intended direction of travel of the fishing lure when secured to a fishing line and when traveling through water as when trolling. In still another embodiment, the head portion also includes a first elongated slit extending along the length thereof and disposed in communicating relation with the channel formed in the interior of the head portion. In yet another embodiment, the head portion has an exterior surface and the slit extends from the exterior surface and is disposed into the channel. The slit is dimensioned to allow the passage of the fishing line therethrough into the interior of the channel.

One embodiment of the present invention comprises the fishing lure or fishing tackle assembly including a locking member. The locking member preferably has a substantially elongated configuration sized to generally correspond to that of the head portion, and further includes, an interior passage formed therein. The interior passage is dimensioned, disposed and configured to receive and maintain a fishing line, leader wire, etc, in a generally centered, co-axial relation on the interior of the locking member. In yet another embodiment, the locking member also includes an elongated slit formed therein which extends along the length thereof. This second slit communicates with the interior passage formed within the locking member and is dimensioned and configured to allow passage of the fishing line therethrough and into the interior passage of the locking member. In a further embodiment, the exterior dimension and configuration of the locking member are such as to permit the locking member to be movably situated within the channel formed in the head portion, such as by initially inserting the locking head through the leading open end thereof. In one embodiment of the present invention, the exterior surface the locking member is cooperatively structured with the interior surface of the channel, such as by providing a threaded, mating engagement therebetween. By virtue of this cooperative structuring, the locking member is allowed at least a minimal or limited rotation relative to the interior surface of the channel so as to allow the locking member to be selectively disposed into and out of a locked position. More specifically, the locked position is defined when the first elongated slit in the head portion and the second elongated slit in the locking member are disposed out of co-planar or aligned relation to one another so as to prevent a leader wire, fishing line, etc, from inadvertently being removed from the lure.

In order to mount the locking member to the head portion it may be inserted into the head portion through the open end, as set forth above, and then rotated into a position, wherein the first slit of the head portion and the second slit of the locking member are disposed in a preferred orientation relative to one another dependent of whether the leader wire, fishing line, etc, is intended to be positioned in the interior of the lure or whether it is already positioned on the interior of the lure and intended to be maintained therein in a locked position. As set forth above, once the locking member is rotated into a locked position, the fishing line is prevented from inadvertently passing back through both the first and second slits of the head portion and locking member, respectively and becoming separated from the fishing lure assembly since the first and second slits are no longer in an aligned, substantially co-planar relation to one another.

The present invention also includes, in addition to a head portion, a skirt having a base portion fixedly secured generally at or substantially adjacent to the trailing end of the head portion with a main body extending rearwardly and outwardly therefrom. The main body of the skirt is preferably formed of a plurality of flexible material fingers or stringers which may assume a variety of different sizes, colors, configuration, etc. dependent upon the overall intended design of the lure assembly. In this embodiment, the base portion also includes a slit formed therein which is sized, configured and dimensioned to allow the passage of the fishing line therethrough and into a hollow, tubular interior of the skirt. Preferably, the slit in the skirt base portion is aligned with the first slit disposed in the head portion. Also, in this embodiment, the main body of the skirt is sized, configured and dimensioned to overlie and at least partially cover the bait fish attached to and making up the pre-rigged bait structure.

As such, the present invention is capable of being attached to the trolling or leader wire of the pre-rigged bait structure along any portion of the length thereof, or even along the fishing line, without requiring the disassembling, cutting, detaching or untying of any portion of either the trolling line or the fishing line.

Accordingly, the present invention provides a fishing lure assembly or fishing tackle component which is capable of being easily and quickly attached or detached from a fishing line or other rigging associated therewith such as a pre-rigged bait structure, without requiring the disassembling, cutting or severing of the line or the associated rigging in order to accomplish such attachment or detachment. Also, the fishing lure assembly or like fishing tackle component of the present invention, is attachable to a fishing line or associated rigging, at any conventional or desired location.

The present invention is further directed to a fishing lure assembly which is capable of use in combination with a pre-rigged bait structure which may or may not include a bait fish, and which is attachable to a fishing line by means of a trolling or leader wire in a conventional fashion. The fishing lure assembly may be mounted on or removed from the trolling or leader wire of the pre-rigged bait structure without requiring disassembling, cutting or severing of any portion of the fishing line, trolling or leader wire or pre-rigged bait structure.

The fishing lure or fishing tackle assembly of the present invention is structured to preform the same as a conventional fishing tackle component or lure assembly when practicing the various techniques of fishing including but not being limited to offshore trolling. The fishing lure assembly may have any number of preferred design configurations and/or appearances as to replicate the design configurations of the more popular lure assemblies which have achieved popularity with anglers when implementing a variety of fishing techniques. Also, the fishing lure assembly or like fishing tackle component may be manufactured from durable material so as to enjoy a long operable life under the typically adverse conditions associated with deep sea and/or offshore fishing and should be available to the consuming public at a cost equivalent to that of conventional lure assemblies or like fishing components.

The present invention also relates to a method of attaching and removing a line from a fishing lure assembly. In one embodiment, the method comprises: providing a fishing lure assembly comprising a head portion having a channel in its interior portion and a slit extending from its exterior surface and being disposed into the channel, the head portion also including a locking member situated within the channel; sliding the fishing line or leader wire through the slit into the channel; and moving the locking member to close access from the slit into the channel in a closed position to thereby secure the wire or line within the channel.

In another embodiment, the locking member includes an interior passage and a slit extending from its exterior into the interior passage and the method further comprises aligning the slit of the head portion with the slit of the locking member in preparation for securing the line.

In still another embodiment, the method comprises sliding the line through the slits of the head portion and the locking member respectfully and into the interior passage of the locking member. In yet another embodiment, the method further comprises moving the locking member to close access from the slits into the interior passage and securing the line withing the interior passage and the channel.

In still yet another embodiment, the skirt includes a base portion with a bore in its interior and a slit extending from its exterior to the bore and the method further comprises aligning the slit of the head portion with the slit of the base portion with one another, and positioning the slit of the locking member in an angularly offset configuration into the closed position.

In a further embodiment, the skirt comprises a threaded surface and the locking member comprises a threaded screw, and the method further comprises screwing the screw into the threaded surface to define a mating engagement between the channel with the locking member.

It should be further noted that the terms fishing line, trolling wire and leader wire may, to at least some extent be used interchangeably, at least in terms or the location on the rigging at which the fishing lure assembly of the present invention is mounted. This is due to the fact that the head portion and the locking member as described in even greater detail hereinafter are cooperatively structure so as to be attachable to either the fishing line and/or the trolling or leader wire in the same manner and to accomplish the same results. Accordingly, in terms of location of the fishing lure assembly of the present invention, this different components of the rigging structure use by a fisherman are considered to be equivalent and a part of the intended scope and spirit of the present invention.

The above noted features and advantages of the present invention will become more clear when the drawings as well as the detailed description are taken into consideration.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 1 is a side view of a conventional pre-rigged bait structure of the type which attaches a connecting loop to the free distal end of a fishing line;

FIG. 2 is a partially exploded side view of the fishing lure assembly according to the present invention in one embodiment;

Figure 3:
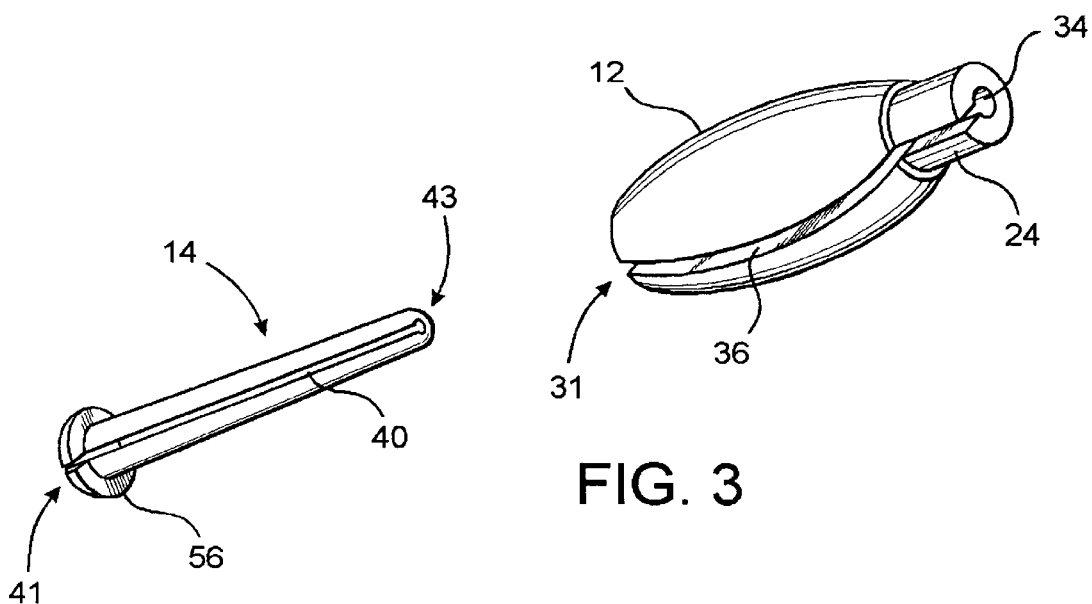
FIG. 3 is a partially exploded perspective view of the unassembled head portion and locking member of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

As shown in the accompanying Figures, the present invention is directed to a fishing lure assembly, generally indicated as 10. With reference to FIGS. 2–8, the fishing lure assembly 10 is seen to comprise at least a head portion 12 and a locking member 14. In one embodiment, the fishing lure assembly 10 will also include a skirt, generally indicated as 16, which ideally is formed of a flexible material having one or more colors. Also, the skirt 16 comprises a base portion 18 and a main body defined by a plurality of trailing fingers or stringers 20. The skirt 16 is preferably mounted to the head portion 14, ideally with the base portion 18 thereof glued or otherwise fixedly secured to a trailing end 24, of the head portion 12. The trailing stringers 20 preferably extend rearwardly and outwardly from the base portion 18 or the skirt in at least partially covering relation to a bait fish 21. In another embodiment, the head portion 12 comprises the body of the assembly 10. In still another embodiment, the head portion 12 simulates a fish or other animal forms.

More particularly, the fishing lure assembly 10 is of the type which is adapted for use in combination with a commonly used, pre-rigged bait structure such as that shown in FIG. 1. In general, this type of pre-rigged bait structure includes a bait fish 21, secured to a distal end of a trolling or leader wire 23 and a connecting loop, 25, formed in or secured to the opposite end of the trolling wire 23. Pre-rigged bait structures of the type illustrated in FIG. 1 are often commercially available to a person purchasing bait for trolling or offshore fishing. It is to emphasized that the fishing lure assembly 10, of the present invention, may also be used with a somewhat conventional pre-rigged bait structure which does not include the attachment of the trolling or leader wire 23 or are secured to a portion of the lure itself. In any event, the connecting loop, 25 is structured to be removably attached to a snap swivel (not shown) or similar device disposed at the free, distal end of a fishing line, so as to interconnect the pre-rigged bait structure with the fishing line in the conventional manner. Typically, the pre-rigged bait structure of FIG. 1, will be used with a fishing lure positioned generally between the connecting loop 25 and the bait fish 21. In such a position, the base 18 and stringers 20 of the skirt 16 will overlie and at least partially cover the bait fish 21 as clearly shown in FIG. 2. This is done at least in part for purposes of camouflaging the fishing lure 10 so that is presents the appearance of a live bait fish, with the hope of enticing a desired game fish to bite and become hooked on one or more hooks 19 typically disposed in at least partially embedded position within the bait fish. However, and as had been described, in order to mount a conventional fishing lure into a preferred position relative to the pre-rigged bait structure, one is normally required to disassemble the connecting loop 25 or separate the connecting loop 25 from the trolling wire 23, and then, to thread the trolling wire 23 through the various components of the fishing lure. Then connecting loop 25 must then be re-assembled and/or re-attached to trolling wire 23 so that connecting loop 25 can be connected to a snap swivel a the free, distal end of the fishing line. Each of these steps must be taken not only to mount a sighing lure to a pre-rigged bait structure, but in reverse, to remove a fishing lure therefrom, whether to be replaced with a new fishing lure or to outfit the fishing lure with new bait fish. It is not only inconvenient, but also cumbersome, and in adverse weather conditions or in rough water, the task is only made more difficult and time consuming.

Accordingly, the present invention is structured to provide for the attachment of a fishing lure assembly 10 to the trolling wire 23 (or fishing line itself) and into the desired position, without requiring the disassembling, cutting or otherwise disturbing of any portion of the pre-rigged bait structure of the type shown in FIG. 1.

Figure 4:
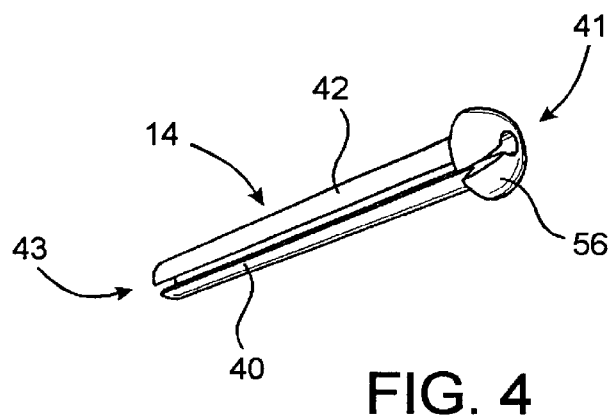
FIG. 4 is a perspective view of a locking member of the fishing lure assembly according to the embodiment of FIGS. 2–3 of the present invention.
Figure 5:
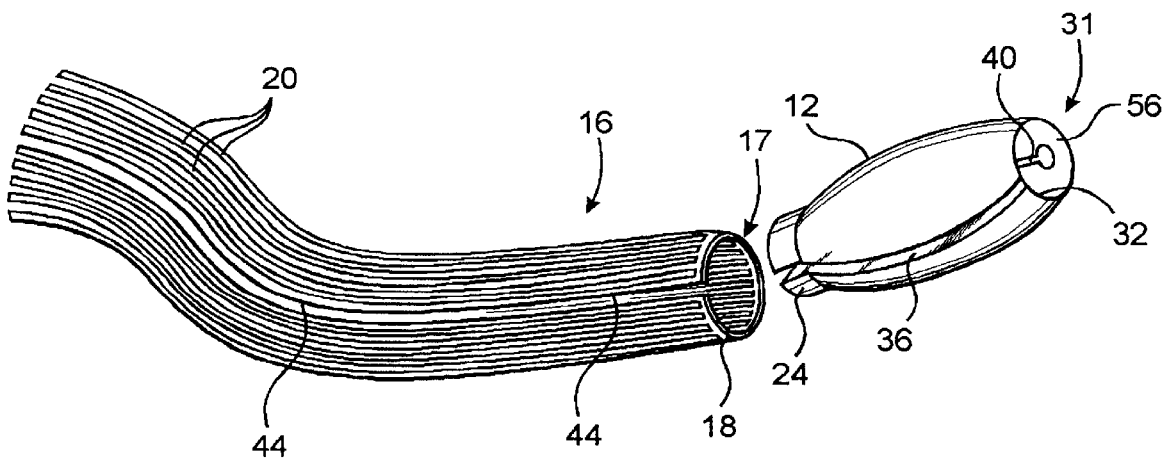
FIG. 5 is an exploded perspective view of the head portion, locking member and skirt portion of the fishing lure assembly according to the present invention.
Figure 6:
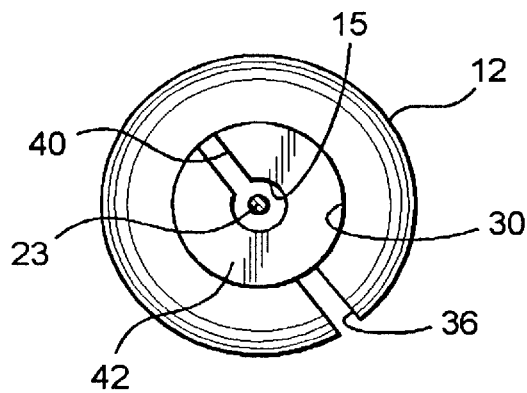
FIG. 6 is a cross-sectional view of a head portion and locking member of the fishing lure assembly in a locked position relative to one another.

With reference to FIGS. 2–8 the head portion 12 of the present invention includes a leading front end 31, a trailing back end 24, and a channel 30 formed therein. The channel 30 preferably extends substantially, if not entirely along the length of the head portion 12. The interior dimensions and configuration of the channel 30 substantially correspond to the exterior dimension and configuration of a locking member 14, which as described hereinafter, is structured to be inserted within the channel 30 through the leading end 31 of the head portion 12. As best shown in FIGS. 3, 5–6, the head portion 12 includes a slit 36, which will hereinafter be termed as a first slit, having an elongated configuration and extending substantially, if not entirely along the length of the head portion 12 and the channel 30. This first slit 36 is disposed in communicating relation with the interior of channel 30 and is transversely dimensioned to receive and allow passage therethrough of the trolling wire 23, or a fishing line, should an alternative use with other fishing tackle components be desired. Additional features of the head portion 12 may include the provision of a pair of simulated eyes or other "fish-like" features on the body thereof, to further provide the appearance of a real fish.

With primary reference to FIGS. 3–4 the locking member 14 of the present invention will now be described. The locking member 14 includes a front or leading end 41, a rear or trailing end 43 and a main body, 42 extending between ends 41 and 43, and in the preferred embodiment, has a substantially elongated configuration which or preferably is sized to substantially correspond to the length of the head portion as shown throughout the drawings. In one embodiment of the present invention, the outer diameter and configuration of the main body 42of the locking member 14 is sized so as to permit the locking member 14 to be removably inserted within the channel 30 of the head portion 12, preferably through the leading open end 32 thereof, as described below. Also in one embodiment, the relative dimensioning between the exterior surface of the locking member 14 and the interior surface of the channel 30 should be such as to accomplish a press fitted engagement therebetween so as to restrict, if not prevent altogether, rotation of the locking member 14 relative to the head portion 12 of the fishing lure 10. As shown in FIG. 3 this may be accomplished by providing body 42 with a tapered configuration extending convergently from leading end 41 to trailing end 43. The locking member may thereby be disposed in what is referred to as a locking position. To accomplish this, and as will be further described hereinafter, the main body 42 of the locking member 14 might be formed to include the tapered configuration extending from the front end 41 to the second, or trailing end 43, or alternatively, the front end 41 or locking member 14 might include an enlarged head 56 serving as a stop member to prevent passage of the locking member 14 through the head portion 12 from the leading end 31 to the trailing end 24 and through the open end 34.

The locking member 14 additionally includes an interior passage 15 formed therein, preferably in a centrally disposed, substantially co-axial relation to the longitudinal axis of the locking member 14. The interior passage 15 is dimensioned, disposed and configured to receive and maintain the fishing line or trolling wire therein, and preferably, in a generally centered, co-axial relation to the locking member 14. In addition, the locking member 14 also includes an elongated slit 40 formed therein which shall hereinafter be referred to as a second slit and which preferably, extends along the length of the locking member 14 from and into the first end 41 to and into trailing end 43. This second slit 40 communicates with the central interior passage 15 formed within the locking member 14 and is also transversely sized and dimensioned to allow passage of the trolling wore 23, or fishing line therethrough, dependent upon the rigging or tackle assembly which is being used, and into the interior passage 15 of the locking member 14 is disposed in the locked position as best shown in FIG. 6.

Referring now to FIG. 2, the attachment of the fishing lure assembly 10 to the trolling wire 23 will now be described. As a first step, the locking member 14 is either removed from the head portion 12 or alternatively, the locking member is rotated so that the second slit 40 thereof is aligned with the first slit 36 of the head portion 12. Next, the trolling wire 23, or fishing line as the case may be, is passed through both the elongated first slit 36 of the head portion 12 and the second elongated slit 40 of the locking member 14. This will serve to effectively center the trolling wire 23 within the elongated channel 30 as well as the interior passage 15 of the head portion 12 and locking member 14, respectively. Once this is accomplished, and assuming the head portion 12 and locking member 14 are generally in the position shown in FIG. 2, the trailing end 43 of the locking member 14 is inserted through the leading open end 32 of the channel 30 and rotated into what may be defined as the locking position of FIG. 6. In particular, the locking member 14 may be disposed in the locking position by rotation thereof, either in a clockwise or counter clockwise direction, so that the second slit 40 will be angularly off-set from the first slit 36 of the head portion 12, whether prior to insertion into the head portion 12 or upon partial insertion therein. It should be pointed out the action of the water during use of this embodiment of the lure assembly 10 in trolling, will aid in maintaining the locking member 14 in the locking position as the force of the water passing over the lure assembly 10 will be directed against both the front leading end 31 of the head portion 12 and the enlarged end 56 of the first leading end 41 of locking member 14, thereby preventing removal of the locking member 14, in a rearward direction, relative to the direction of travel. Additionally, in another embodiment, when the length of the main body 42 of the locking member 14 substantially corresponds to the length of the first slit 36 and the head portion 12, the trolling wire 23 or fishing line will not become interrupted nor otherwise bend at the rear trailing end of the head portion 12 as the assembly 10 travels through the water.

As best shown in FIGS. 2 and 5, the fishing lure assembly 10 preferably also includes the skirt 16. Ideally, the skirt 16 will include the base portion 18 which is fixedly secured to the trailing end 24 of the head portion 12 and includes an open interior 17 to accommodate the intended placement of the trolling wire 23 and bait fish 21 in the manner shown in FIG. 2. When the skirt 16 is utilized in the manner of FIG. 2, the channel 30 of head portion 12 will communicate directly with the open interior 17 within the base portion 18 of skirt 16. In order to further permit the mounting of the fishing lure assembly 10 on the pre-rigged bait structure of FIG. 1 without any aligned with the first slit 36 of the head portion 12 due to the fixed attachment of the base 18 to the trailing portion 24 of the head portion 12. This alignment will serve to facilitate the attachment of the fishing lure assembly 10, including the skirt 16, to the trolling wire 23, with the trolling wire 23 disposed in substantially centered, coaxial relaxation within the cannel 30 and also centered within the passage 15 of the locking member 14. That is, the first slit 36 and third slit 44 are fixedly connected in aligned, communicating, co-planar relation to one another to permit the trolling wire 23 or fishing line to readily pass into the interior of the channel 30 and also extend through the interior 17 of the base portion 18 of the skirt 16. Fixed attachment of the base portion 18 to head portion 12 may be accomplished in accordance with the embodiment of FIG. 6 by forming a counter groove or recessed configuration at the trailing end 24 of the head portion 12. The base portion 18 of the skirt 16 is formed from a flexible material, thereby enabling the base portion 18 to conform to the configuration of the trailing end 24 of the head portion 12. However, in order to maintain the trolling wire and/or fishing line 23 in co-axial, substantially concentrically disposed position on the interior of both the locking member 14 and the head portion 12, when the locking member 14 is in its locked position, the second elongated slit 40 is still maintained in an angular, off-set relation from the aligned first and third slits 36 and 40 as best shown in FIG. 6.

Figure 7:
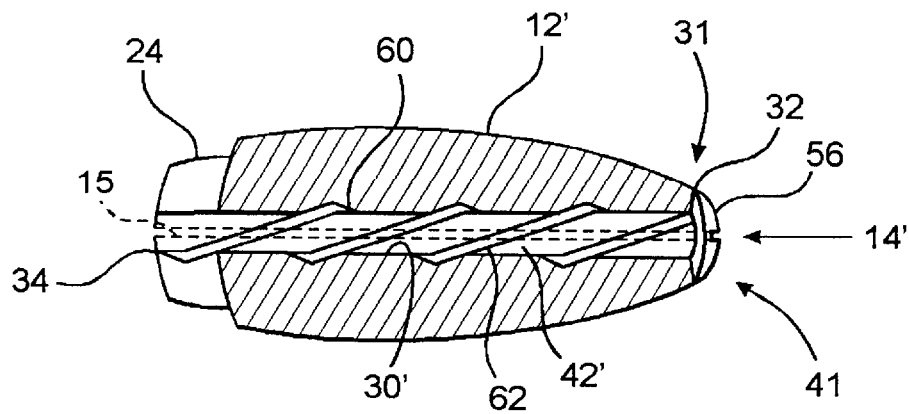
FIG. 7 is a longitudinal sectional view of another embodiment of the fishing lure assembly of the present invention.
Figure 8:
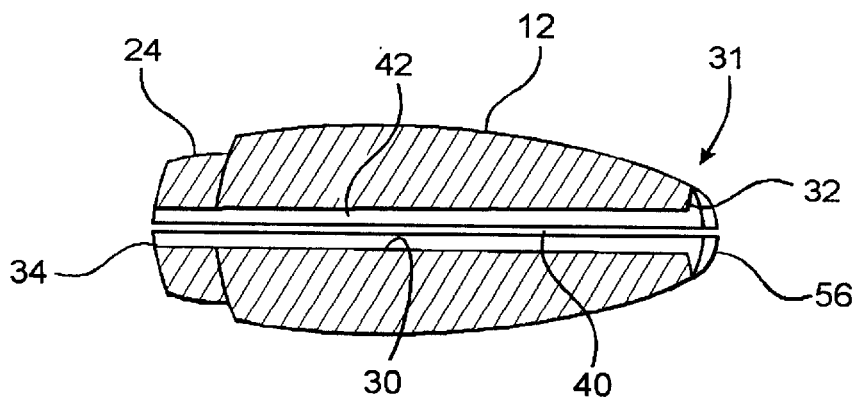
FIG. 8 is a longitudinal sectional view of the assembled embodiment illustrated in FIG. 3.

Yet another embodiment of the present invention is shown in FIG. 7, wherein the base portion 12' includes an elongated channel 30' having an interior surface thereof formed into a screw threaded configuration along at least a portion of the length thereof as indicated at 60. In addition the locking member 14' has an exterior surface of the main body 42' thereof also formed into a screw threaded configuration 62. Accordingly, the first screw threaded configuration 60 formed on the inner surface of the channel 30' is specifically dimensioned, disposed and structured to mate with the second screw threaded configuration 62 formed on the outer surface of the main body 42' of the locking member 14 may be screw threaded within the interior of the channel 30' and held there in place. In this embodiment the enlarged head 56 of the locking member 14' may or may not be utilized since the screw threaded, mating engagement between the portion 60 and 62, as set forth above, will be sufficient to maintain the locking member in the desired location on the interior of the base portion 12' during the trolling procedure. In addition the first and second screw threaded configurations 60 and 62 respectively are such as to allow and facilitate the orientation of the locking member 42' into the locking position as described specifically with reference to FIG. 6, thereby preventing inadvertent removal of the trolling wire 23 or other fishing line from passing out of the locking member 14' and head portion 12'.

Since many modifications, variations and changes in detail can be made to the described preferred embodiment of the invention, it is intended that all matters in the foregoing description and shown in the accompanying drawings be interpreted as illustrative and not in a limiting sense. For example, although the invention described in the detailed description has primary relevance to a fishing lure, structural features of the present invention could also be incorporated in other fishing tackle components, other than a fishing lure assembly, such as but not limited to a weighted sinker or the like, and therefore, the spirit and scope of the present invention should be considered to extend to one or more fishing tackle assemblies or components. For these and other reasons, the scope of the invention should be determined not solely by the appended claims, but also their legal equivalents.

Now that the invention has been described,
What is claimed is:

1. A fishing lure assembly comprising:
   a) a head portion having a channel formed on an interior and extending along a length thereof,
   b) said channel terminating in a leading open end and an oppositely disposed trailing open end respectively positioned at a leading end and a trailing end of said head portion,
   c) a first slit dimensioned to receive a fishing line therethrough and formed in said head portion between said leading end and said trailing end, said first slit disposed in communicating relation with said channel,
   d) an elongated locking member including an interior passage, said locking member removably inserted into said channel through said leading open end and positionable into and out of a locked position,
   e) said locking member having a length at least equal to said channel and including a second slit formed therein and extending along the length thereof, said second slit communicating with said interior passage and dimensioned to receive the fishing line therethrough for disposition thereof within said interior passage,
   f) said locked position at least partially defined by said first and said second slits disposed in angularly, offset relation to one another when said locking member is disposed within said channel,
   g) said locking member further comprising a stop member secured to one end thereof and extending exteriorly of said channel and said head portion,
   h) said stop member extending radially outward from said one end of said locking member in overlying engagement with said leading end of said head portion, and
   i) said stop member having a greater transverse dimension than said channel to restrict passage of said stop member and said locking member completely through said channel from said leading end to said trailing end of said head portion.

2. A fishing lure assembly as recited in claim 1 wherein said locking member includes a substantially tapered configuration at least partially defined by a progressively decreasing transverse dimension from a leading portion to a trailing portion thereof.

3. A fishing lure assembly as recited in claim 2 wherein said leading portion of said locking member comprises a transverse dimension larger than an average transverse dimension of said channel.

4. A fishing lure assembly as recited in claim 1 wherein said head portion comprises an inner surface of said channel including a first threaded configuration; said locking member including a second threaded configuration integrally formed on an outer surface thereof; said first and said second threaded configurations disposed and structured to define a mating engagement between said head portion and said locking member.

5. A fishing lure assembly as recited in claim 1 wherein said channel and said locking member are cooperatively disposed and dimensioned such that at least a majority of the length of said head portion is disposed in substantially surrounding relation to at least a majority of the length of said locking member when said locking member is in said locked position.

6. A fishing lure assembly as recited in claim 5 wherein said locked position is further defined by said interior passage of said locking member and said channel of said head portion being disposed in substantially co-axial relation to one another.

7. A fishing lure assembly as recited in claim 6 wherein said head portion and said locking member are cooperatively structured and relatively disposed to capture the fishing line within said interior passage and substantially along a central longitudinal axis thereof when said locking member is in said locked position.

8. A fishing lure assembly comprising:
   a) a head portion having a channel formed on an interior and extending along a length thereof,
   b) said channel terminating in a leading open end and an oppositely disposed trailing open end respectively positioned at a leading end and a trailing end of said head portion,
   c) a first slit dimensioned to receive a fishing line therethrough and formed in said head portion between said leading end and said trailing end, said first slit disposed in communicating relation with said channel,
   d) an elongated locking member including an interior passage, said locking member removably inserted into said channel through said leading open end and positionable into and out of a locked position,
   e) said locking member having a length at least equal to said channel and including a second slit formed therein and extending along the length thereof, said second slit communicating with said interior passage and dimensioned to receive the fishing line therethrough for disposition thereof within said interior passage,
   f) said locked position at least partially defined by said first and said second slits disposed in non-coplanar relation to one another when said locking member is disposed within said channel,
   g) a skirt including a base portion fixedly secured to said trailing end of said head portion, said base portion having an open interior disposed to receive the fishing line therein,
   h) said base portion including a third slit formed therein in communicating relation with said open interior and fixedly disposed in aligned relation with said first slit to allow substantially concurrent positioning of the fishing line through said first and third slits, and
   i) said second slit disposed in non-coplanar relation with said first and third slits when said locking member is in said locked position.

9. A fishing lure assembly as recited in claim 8 wherein said locking member includes a substantially tapered configuration at least partially defined by a progressively decreasing transverse dimensioned from a leading portion to a trailing portion thereof.

10. A fishing lure assembly as recited in claim 9 wherein said leading portion of said locking member comprises a transverse dimension larger than an average transverse dimension of said channel.

11. A fishing lure assembly as recited in claim 8 wherein said head portion comprises an inner surface of said channel including a first threaded configuration; said locking member including a second threaded configuration integrally formed on an outer surface thereof; said first and said second threaded configurations disposed and structured to define a mating engagement between said head portion and said locking member.

12. A fishing lure assembly as recited in claim 8 wherein said channel and said locking member are cooperatively disposed and dimensioned such that at least a majority of the length of said head portion is disposed in substantially surrounding relation to at least a majority of the length of said locking member when said locking member is in said locked position.

13. A fishing lure comprising:
a) a head portion having a channel formed on an interior and extending along a length thereof,
b) said channel terminating in a leading open end and an oppositely disposed trailing open end respectively positioned at a leading end and a trailing end of said head portion,
c) a first slit dimensioned to receive a fishing line therethrough and formed in said head portion between said leading end and said trailing end, said first slit disposed in communicating relation with said channel,
d) an elongated locking member including an interior passage, said locking member removably inserted into said channel through said leading open end and positionable into and out of a locked position,
e) said locking member having a length at least equal to said first slit and including a second slit formed therein and extending along the length thereof, said second slit communicating with said interior passage and dimensioned to receive the fishing line therethrough for disposition thereof within said interior passage,
f) said locked position at least partially defined by said first and said second slits disposed in angularly, offset relation to one another when said locking member is disposed within said channel,
g) said locking member further comprising a stop member secured to one end thereof and extending exteriorly of said channel and said head portion,
h) said stop member extending radially outward from said one end of said locking member and in overlying relation with said leading end of said head portion,
i) said stop member having a greater transverse dimension than said channel to restrict passage of said stop member and said locking member completely through said channel from said leading end to said trailing end of said head portion,
j) a skirt including a base portion fixedly secured to said trailing end of said head portion, said base portion having an open interior disposed to receive the fishing line therein,
k) said base portion including a third slit formed therein in communicating relation with said open interior and fixedly disposed in coplanar relation with said first slit to allow substantially concurrent positioning of the fishing line through said first and third slits, and
l) said second slit disposed in non-coplanar relation with said first and third slits when said locking member is in said locked position.

14. A fishing lure assembly as recited in claim 13 wherein said locking member includes a substantially tapered configuration at least partially defined by a progressively decreasing transverse dimensioned from a leading portion to a trailing portion thereof.

15. A fishing lure assembly as recited in claim 14 wherein said leading portion of said locking member comprises a transverse dimension larger than an average transverse dimension of said channel.

16. A fishing lure assembly as recited in claim 13 wherein said head portion comprises an inner surface of said channel including a first threaded configuration; said locking member including a second threaded configuration integrally formed on an outer surface thereof; said first and said second threaded configurations disposed and structured to define a movable mating engagement between said head portion and said locking member.

17. A fishing lure assembly as recited in claim 13 wherein said channel and said locking member are cooperatively disposed and dimensioned such that at least a majority of the length of said head portion is disposed in substantially surrounding relation to at least a majority of the length of said locking member when said locking member is in said locked position.

* * * * *